United States Patent [19]

Gosser et al.

[11] Patent Number: 4,832,938

[45] Date of Patent: May 23, 1989

[54] HYDROGEN PEROXIDE PRODUCTION METHOD USING PLATINUM/PALLADIUM CATALYSTS

[75] Inventors: Lawrence W. Gosser, Wilmington, Del.; Jo-Ann T. Schwartz, Chadds Ford, Pa.

[73] Assignee: E. I. Du Pont de Nemours and Company, Wilmington, Del.

[21] Appl. No.: 193,843

[22] Filed: May 13, 1988

[51] Int. Cl.$^4$ .............................................. C01B 15/02
[52] U.S. Cl. .................................................... 423/584
[58] Field of Search ......................................... 423/584

[56] References Cited

U.S. PATENT DOCUMENTS

| | | | |
|---|---|---|---|
| 3,361,533 | 1/1968 | Hooper | 423/584 |
| 4,009,252 | 2/1977 | Izumi et al. | 423/584 |
| 4,279,883 | 7/1981 | Izumi et al. | 423/584 |
| 4,681,751 | 7/1987 | Gosser | 423/584 |
| 4,772,458 | 9/1988 | Gosser et al. | 423/584 |

Primary Examiner—John Doll
Assistant Examiner—Wayne A. Langel

[57] ABSTRACT

An improved method for making hydrogen peroxide from the direct combination of hydrogen and oxygen using a platinum/palladium catalyst in which the weight ratio of platinum to platinum plus palladium is in the range of about 0.02 to about 0.2.

4 Claims, 4 Drawing Sheets

HYDROGEN PEROXIDE PRODUCTION METHOD USING PLATINUM/PALLADIUM CATALYSTS

FIELD OF THE INVENTION

The present invention relates to methods for producing hydrogen peroxide from the direct combination of hydrogen and oxygen.

BACKGROUND OF THE INVENTION

Methods for producing hydrogen peroxide from the direct combination of hydrogen and oxygen are known.

U.S. Pat. No. 4,681,751 to Gosser describes a process for making hydrogen peroxide from hydrogen and oxygen using a palladium on carbon catalyst and superatmospheric pressure. The reaction medium contains substantially no organic component.

U.S. Pat. No. 4,772,458 to Gosser et al. discloses a direct combination process for the production of hydrogen peroxide. This patent discloses the preparation and use of combination platinum/palladium catalysts.

SUMMARY OF THE INVENTION

The present invention is a process for making hydrogen peroxide from the direct combination of hydrogen and oxygen using a platinum/palladium catalyst in which the ratio of platinum to platinum plus palladium is optimized. The ratio is in the range of about 0.02 to about 0.2, on a weight basis.

BRIEF DESCRIPTION OF THE DRAWINGS

The drawings consists of four figures.

DETAILED DESCRIPTION OF THE INVENTION

Figure 1:
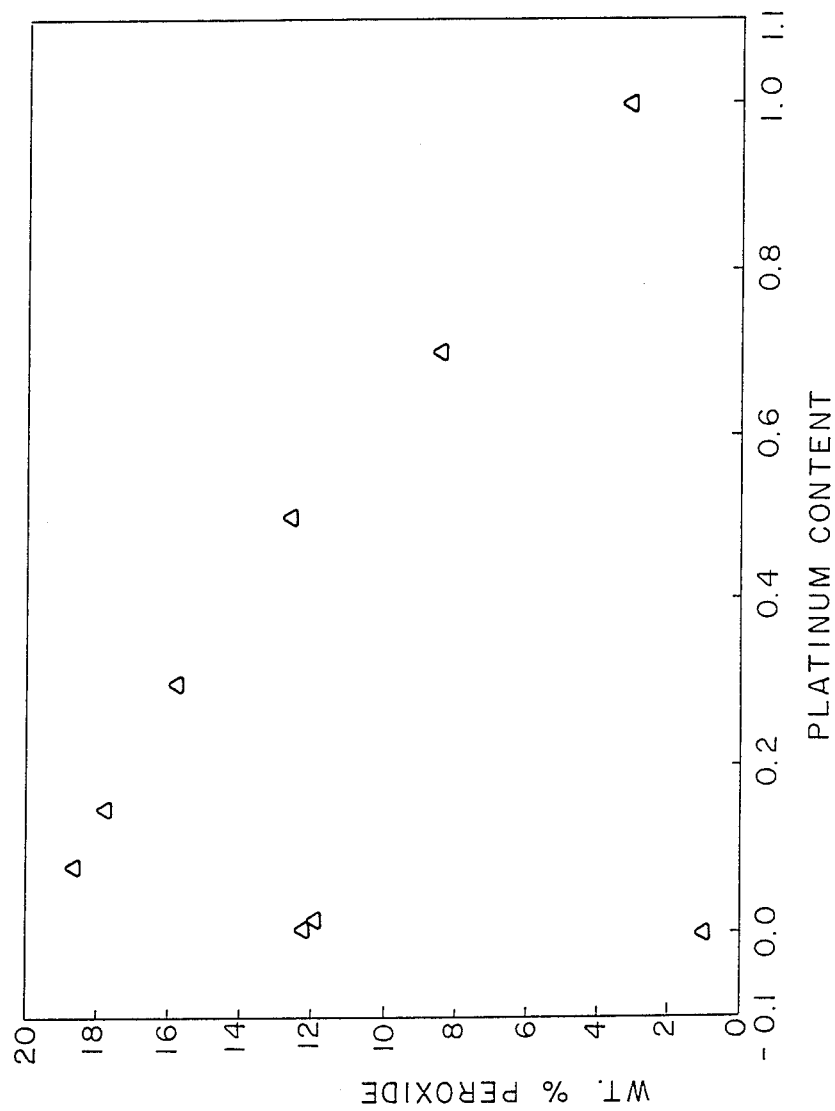
FIG. 1 shows weight percentage $H_2O_2$ vs. $Pt/(Pt+Pd)$, using an alumina support.

The production of hydrogen peroxide from the direct combination of hydrogen and oxygen using a combination of platinum/palladium supported catalyst and a bromide promoter is described in U.S. Pat. No. 4,772,458 to Gosser et al. which is incorporated herein by reference.

It has now been found that the ratio of platinum to platinum plus palladium is a result-effective variable in the process, and that the process can be optimized by carefully controlling the ratio. It has been found that the optimum ratio is from about 0.02 to about 0.2 on a weight basis.

Accordingly, the present invention is a direct combination process using (1) an aqueous reaction medium, having no organic component present in excess of about 2% by weight of the reaction medium; (2) a source of hydrogen ions; (3) either a bromide ion or chloride ion promoter; and a catalyst comprising platinum and palladium, the weight ratio of Pt to (Pt+Pd) being from about 0.02 to about 0.2. The platinum and palladium may be supported on an optional support. The support may be alumina, silica, carbon, and others well-known in the art.

The bimetallic catalyst may be prepared from bulk material, colloids, salts, or by other routes well known to those knowledgeable in the art. An advantage of the bimetallic catalyst is its empirically observed resistance to reaction "upsets".

Further details regarding the preparation and use of the optimized catalyst in accordance with the present invention may be found in the following non-limiting examples and in the figures.

EXAMPLES

Preparation of Supported Pt-Pd Catalysts From Bimetallic Colloids (Catalysts for Examples 1, 2 and 3)

Supported Pt-Pd bimetallic catalysts for Examples 1, 2 and 3 were prepared using a two-step procedure. The first step involved the synthesis of aqueous bimetallic colloids (sols). Generally, these colloids contained very small (less than or equal to 100A) zerovalent Pt-Pd particles. The second step in the catalyst synthesis involved the deposition of these pre-formed zerovalent bimetallic particles onto a support, either by adsorption or by spray drying. The so-formed supported bimetallic catalysts were then heat treated in hydrogen at 200° C. to form the active catalyst. Details of the procedure used to prepare the catalysts used in Examples 1, 2 and 3 follow.

Synthesis of Pt-Pd Colloids

Platinum-palladium bimetallic colloids for Examples 1, 2 and 3 were prepared according to a method similar to that described in Turkevich et al., *Proc. of VII Int. Congr. Catal.* (Elsevier, New York, 1981) at page 160. All glassware was cleaned with aqua regia prior to use. The water was purified by distillation and then filtered through a water purification system equipped with mixed bed ion exchangers and an organic/colloid removal column. $PdCl_2$ solutions and chloroplatinic acid solutions were made up at the specified molarities. Generally 1 mL of 1N HCl was added per 50 mL of water when making up the chloropalladic acid solution. Required aliquots of the above solutions were then used in the colloid synthesis. For each colloid synthesis, the specified amounts of $PdCl_2$ solution and chloroplatinic acid solution are shown in Tables 1-A, 2-A and 3-A along with the amounts of water and $3.4 \times 10^{-2}$ M sodium citrate solution used.

All solutions were filtered through a 0.22 micrometer millipore filter prior to use. A round bottom flask was then charged with the specified amount of water. The water was brought to boiling with an electric heating mantle, and then the $PdCl_2$ solution and the chloroplatinic acid solution were added. The resulting solution was yellow. The solution was brought to boiling and then the sodium citrate solution was added. Generally, within fifteen minutes the solution became darker, and at the end of thirty minutes was completely black. This solution was refluxed for four hours, after which it was allowed to cool, and then transferred to a refrigerator for storage.

The monometallic Pt sols (colloids) in Examples 1, 2 and 3 were prepared similarly, and a procedure for their preparation is found in *8th Simposio Iberoamericano de Catalysis*, La Rabida Huelva, 1982 at p. 27.

The monometallic Pd sols were prepared similarly, except that six hours of reflux is required to make the colloidal Pd particles. Additionally, the Pd sols do not require storage by refrigeration. A procedure for the preparation of colloidal Pd may be found in *Science*, Vol. 160, 1970 at p. 873.

Deposition onto Support

The synthesis of supported catalysts involved using 380 mL of bimetallic colloid prepared as described above. Specific synthesis details for each colloid are shown in Tables 1-A, 2-A and 3-A. Generally, 380 mL of a Pt-Pd colloid was stirred with 2 g of support (Sumitomo AKP-50 alumina having a surface area of about 12 $m^2/g$ for Example 1). The resulting mixture was then spray dried using a Buchi laboratory scale spray dryer. Generally, the spray drying was done using an inlet temperature of 220° C., and an outlet temperature of 110° C. The material collected from the spray drying procedure was a gray-brown powder. This powder was then given a hydrogen treatment according to the following procedure. The powder was loaded into a quartz tube containing a medium-porosity fritted disc. This tube was put in a vertical Lindberg tube furnace. The flow meter was set at 70 mL/min and the sample was purged with helium for twenty minutes, after which the feed gas was switched to hydrogen, and allowed to flow for ten minutes before being heated to 200° C. for one hour in hydrogen. It was then allowed to cool in the hydrogen atmosphere until room temperature was reached. The sample was then flushed with helium for twenty minutes. This material was then used as the active catalyst.

Procedure for Preparing $H_2O_2$ in Examples 1, 2, 3 and 4

Figure 2:
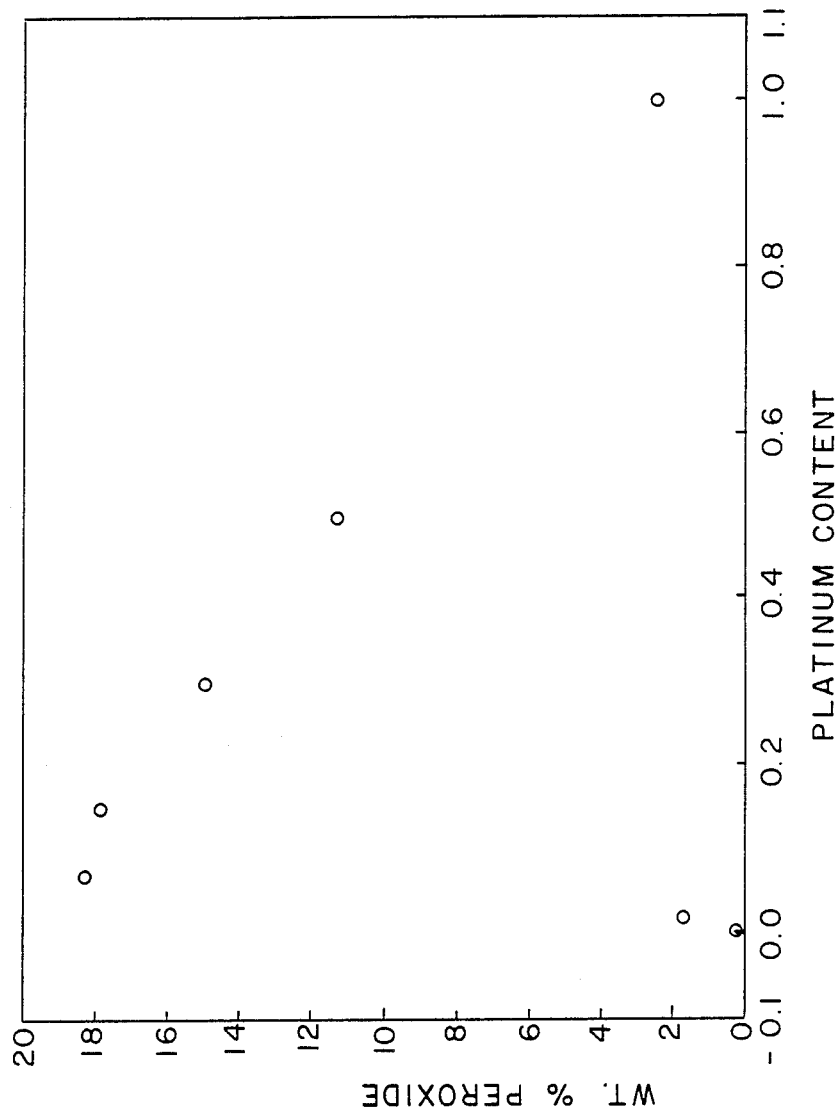
FIG. 2 shows weight percentage $H_2O_2$ vs. $Pt/(Pt+Pd)$, using a carbon support.
Figure 3:
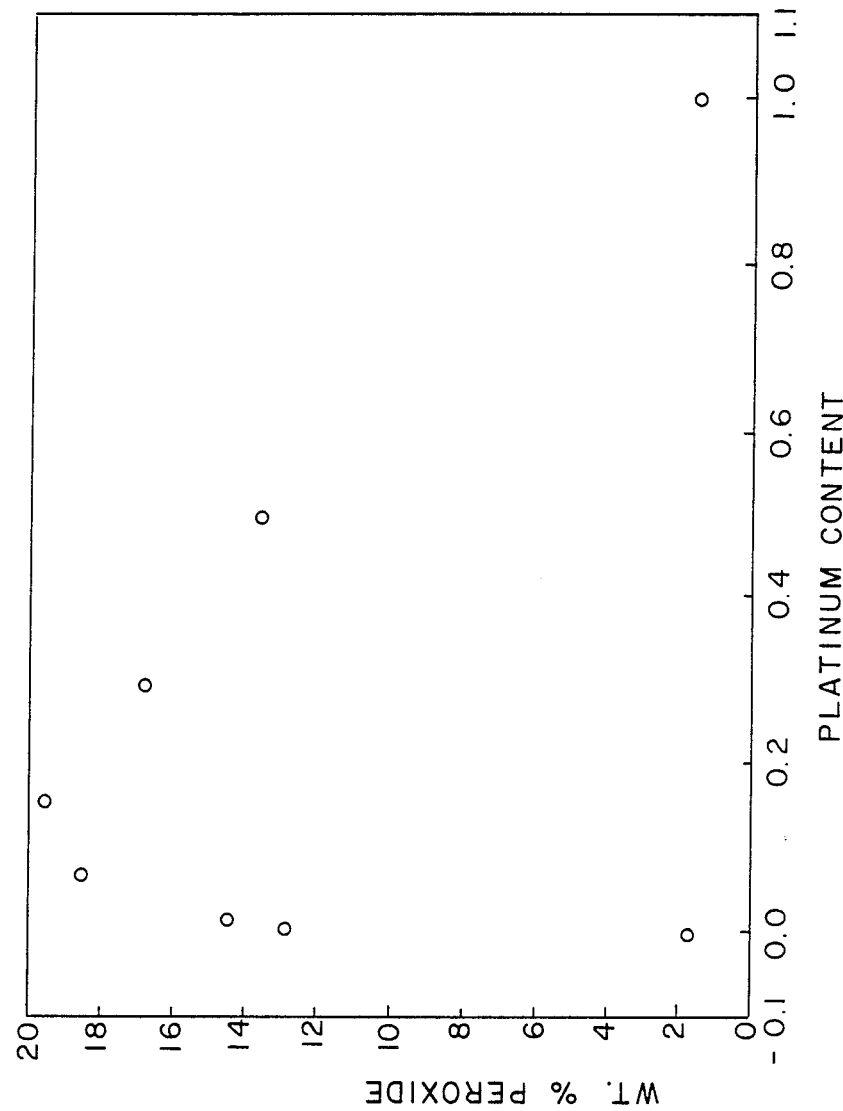
FIG. 3 shows weight percentage $H_2O_2$ vs. $Pt/(Pt+Pd)$, using a silica support.
Figure 4:
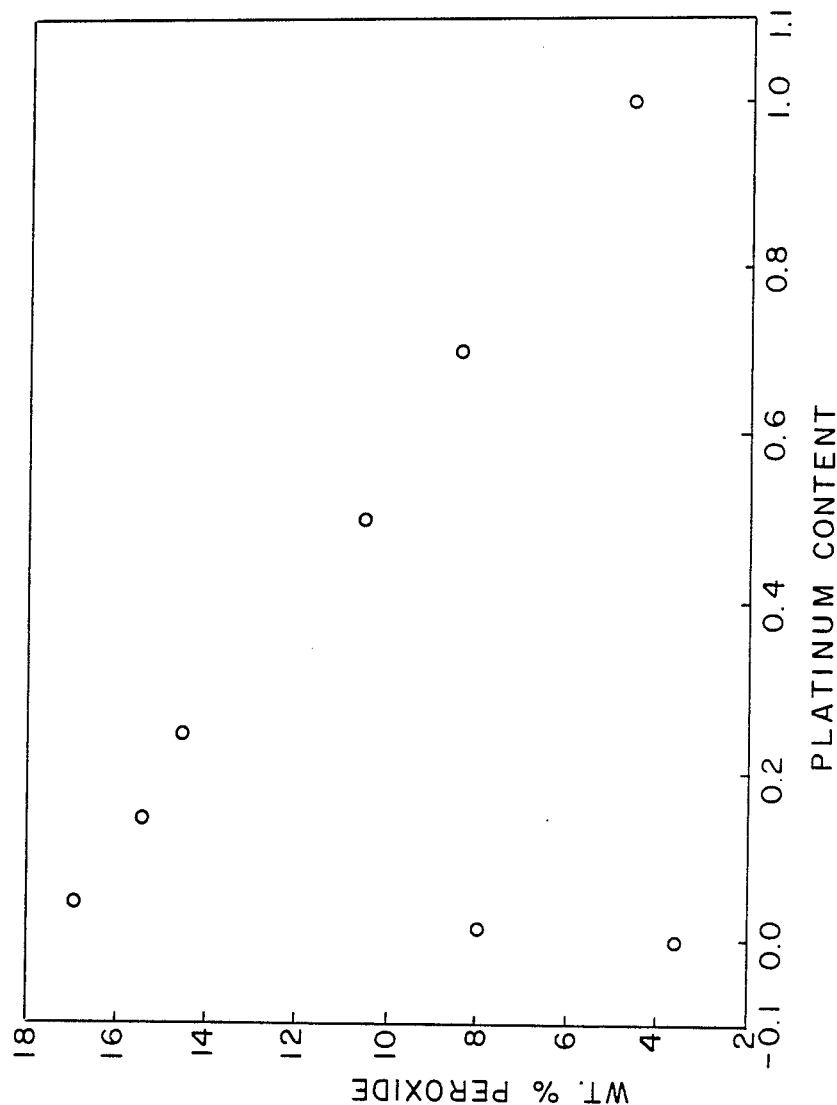
FIG. 4 shows weight percentage $H_2O_2$ vs. $Pt/(Pt+Pd)$, using a silica support. The catalyst was prepared from metal salts.

The apparatus for these experiments was a nominally 400 mL autoclave containing a glass liner. The free space in the empty autoclave-liner combination was about 350 mL. The autoclave was mounted on a shaking table in a large metal barricade with facilities for adding and removing gases and monitoring the pressure and the temperature of the metal autoclave from outside of the barricade. In each case, the experiment was started by weighing the empty glass liner. A catalyst and 20 g of 0.1N aqueous HCl were added, and the liner was reweighed. The liner was placed in the autoclave and the autoclave was placed in a cooling jacket on the shaker table. Argon (about 1000 psi) was added to check for leaks. The pressure was reduced to about 5 psia and then about 360 psia $H_2$ and about 1650 psia $O_2$ were added. After about 15 minutes $O_2$ was added to restore the total pressure to about 2000 psia. The shaking was started and continued for about three hours. The remaining gas was released and the vessel was filled to 50 psig with argon and vented three times to remove the last of the $H_2/O_2$ mixture. The liner was then removed from the autoclave and reweighed. A portion of the reaction mixture was titrated with potassium permanganate solution. The wt% $H_2O_2$ obtained from the titration and the weight gain can be used to calculate the selectivity as moles $H_2O_2$ formed divided by the sum of moles water formed and moles $H_2O_2$ formed. This value was multiplied by 100 to express it as a percentage in the synthesis Tables. Additional details of the individual experiments are given in the Tables. The results are shown graphically in correspondingly numbered FIGS. 1 to 4.

TABLE 1-A

Preparation of Colloids Used to Prepare Catalysts in Example 1

| Prep. | $PdCl_2$ Sol'n. | $H_2PtCl_6 \cdot 6H_2O$ Sol'n. | $3.4 \times 10^{-2}$ M Sodium Citrate | Water (mL) |
|---|---|---|---|---|
| 1a | 75 mL of $7.4 \times 10^{-3}$ M | — | 120 mL | 945 |
| 1b | 225 mL of $7.4 \times 10^{-3}$ M | 0.9 mL of $4.8 \times 10^{-3}$ M | 360 mL | 2832 |
| 1c | 75 mL of $7.4 \times 10^{-3}$ M | 1.0 mL of $4.8 \times 10^{-3}$ M | 120 mL | 944 |
| 1d | 675 mL of $7.4 \times 10^{-3}$ M | 45 mL of $5.7 \times 10^{-3}$ M | 1080 mL | 8460 |
| 1e | 65 mL of $7.4 \times 10^{-3}$ M | 10 mL of $4.8 \times 10^{-3}$ M | 120 mL | 945 |
| 1f | 300 mL of $3.7 \times 10^{-3}$ M | 60 mL of $4.8 \times 10^{-3}$ M | 360 mL | 2700 |
| 1g | 150 mL of $3.7 \times 10^{-3}$ M | 60 mL of $4.8 \times 10^{-3}$ M | 240 mL | 1830 |
| 1h | 150 mL of $3.7 \times 10^{-3}$ M | 120 mL of $4.8 \times 10^{-3}$ M | 360 mL | 2790 |
| 1i | — | 180 mL of $4.8 \times 10^{-3}$ M | 360 mL | 2880 |

TABLE 1-B

| Prep. | Pt / (Pt + Pd) | Temp. °C. | ΔP psi | ΔWT g | Wt. % $H_2O_2$ | Sel (%) |
|---|---|---|---|---|---|---|
| 1a | 0.0 | 10–13 | 11 | 0.4 | 1.1 | 40 |
| 1b | 0.005 | 16–19 | 462 | 4.2 | 12.2 | 55 |
| 1c | 0.016 | 9–13 | 298 | 4.0 | 11.9 | 57 |
| 1d | 0.08 | 5–8 | 394 | 6.0 | 18.6 | 69 |
| 1e | 0.15 | 10–13 | 427 | 6.1 | 17.7 | 62 |
| 1f | 0.3 | 10–12 | 401 | 5.7 | 15.7 | 56 |
| 1g | 0.5 | 9–12 | 412 | 5.5 | 12.5 | 42 |
| 1h | 0.7 | 9–10 | 392 | 4.8 | 8.4 | 31 |
| 1i | 1.0 | 10–13 | 349 | 3.9 | 3.1 | 11 |

EXAMPLE 2

Pt-Pd/Carbon

The preparation of carbon supported catalysts involved using 380 mL of colloid prepared as described above. The specific synthesis details for each colloid are shown in Table 2-A. The bimetallic particles were deposited onto the carbon support by adsorption except for Prep 2a in Table 2-A. In this case, the Pd was deposited onto the carbon by forming a slurry of colloid with carbon followed by spray drying. The spray drying was carried out as described in Example 1.

The rest of the carbon supported catalysts were prepared by forming a slurry containing 380 mL of colloid with two grams of wide pore carbon (325 mesh) having a surface area of 560 $m^2/g$. This slurry was stirred for one hour and then filtered through a 0.22 micrometer millipore filter. UV-VIS spectroscopy was used to demonstrate the absence of bimetallic colloid in the filtrate. The solid remaining on the filter was allowed to air dry and then was loaded into a quartz tube to carry out the hydrogen treatment procedure described in Example 1. The material collected after the hydrogen treatment was the active catalyst.

TABLE 2-A

Preparation of Colloids Used to Prepare Catalysts in Example 2

| Prep. | $PdCl_2$ Sol'n. | $H_2PtCl_6 \cdot 6H_2O$ Sol'n. | $3.4 \times 10^{-2}$ M Sodium Citrate | Water (mL) |
|---|---|---|---|---|
| 2a | 500 mL of $1.86 \times 10^{-3}$ M | — | 1000 mL | 1000 |
| 2b | 75 mL of | 1.0 mL of | 120 mL | 944 |

TABLE 2-A-continued

Preparation of Colloids
Used to Prepare Catalysts in Example 2

| Prep. | $PdCl_2$ Sol'n. | $H_2PtCL_6 \cdot 6H_2O$ Sol'n. | $3.4 \times 10^{-2}$ M Sodium Citrate | Water (mL) |
|---|---|---|---|---|
| 2c | $7.4 \times 10^{-3}$ M 75 mL of | $4.8 \times 10^{-3}$ M 5.0 mL of | 120 mL | 940 |
| 2d | $7.4 \times 10^{-3}$ M 65 mL of | $4.8 \times 10^{-3}$ M 10 mL of | 120 mL | 945 |
| 2e | $7.4 \times 10^{-3}$ M 100 mL of | $4.8 \times 10^{-3}$ M 20 mL of | 120 mL | 900 |
| 2f | $7.4 \times 10^{-3}$ M 150 mL of | $3.7 \times 10^{-3}$ M 60 mL of | 240 mL | 1830 |
| 2g | — | $3.7 \times 10^{-3}$ M 60 mL of $4.8 \times 10^{-3}$ M | 120 mL | 960 |

TABLE 2-B

| Prep. | Pt Pt + Pd | Temp. °C. | ΔP psi | ΔWT g | Wt. % $H_2O_2$ | Sel (%) |
|---|---|---|---|---|---|---|
| 2a | 0.0 | 9–12 | 0 | 0.2 | 0.2 | 12 |
| 2b | 0.016 | 9–10 | 13 | 0.4 | 1.7 | 77 |
| 2c | 0.07 | 11–14 | 427 | 6.4 | 18.4 | 63 |
| 2d | 0.15 | 9–13 | 397 | 6.0 | 17.9 | 65 |
| 2e | 0.3 | 7–92 | 417 | 5.7 | 15 | 53 |
| 2f | 0.5 | 9–11 | 409 | 5.1 | 11.3 | 40 |
| 2g | 1.0 | 9–11 | 415 | 4.6 | 2.4 | 7 |

EXAMPLE 3

Pt-Pd/SiO$_2$

The synthesis of silica supported catalysts involved using 380 mL of colloid prepared as described above. The specific synthesis details for each colloid are shown in Table 3-A. Generally, 380 mL of colloid was mixed with 5 g of an aqueous colloidal dispersion of silica particles commercially available from E. I. du Pont de Nemours and Company under the registered trademark Ludox-HS-40. This mixture was stirred and then spray dried as described above. The material collected after spray drying was then treated in hydrogen as described previously. The material obtained from hydrogen treatment was the active catalyst.

TABLE 3-A

Preparation of Colloids
Used to Prepare Catalysts in Example 3

| Prep. | $PdCl_2$ Sol'n. | $H_2PtCL_6 \cdot 6H_2O$ Sol'n. | $3.4 \times 10^{-2}$ M Sodium Citrate | Water (mL) |
|---|---|---|---|---|
| 3a | 75 mL of $7.4 \times 10^{-3}$ M | — | 120 mL | 945 |
| 3b | 225 mL of $7.4 \times 10^{-3}$ M | 0.9 mL of $4.8 \times 10^{-3}$ M | 360 mL | 2832 |
| 3c | 75 mL of $7.4 \times 10^{-3}$ M | 1.0 mL of $4.8 \times 10^{-3}$ M | 120 mL | 944 |
| 3d | 75 mL of $7.4 \times 10^{-3}$ M | 5.0 mL of $4.8 \times 10^{-3}$ M | 120 mL | 940 |
| 3e | 65 mL of $7.4 \times 10^{-3}$ M | 10 mL of $4.8 \times 10^{-3}$ M | 120 mL | 945 |
| 3f | 300 mL of $3.7 \times 10^{-3}$ M | 60 mL of $4.8 \times 10^{-3}$ M | 360 mL | 2700 |
| 3g | 150 mL of $3.7 \times 10^{-3}$ M | 60 mL of $4.8 \times 10^{-3}$ M | 240 mL | 1830 |
| 3h | — | 180 mL of $4.8 \times 10^{-3}$ M | 360 mL | 2880 |

TABLE 3-B

| Prep. | Pt Pt + Pd | Temp. °C. | ΔP psi | ΔWT g | Wt. % $H_2O_2$ | Sel (%) |
|---|---|---|---|---|---|---|
| 3a | 0.0 | 10–14 | 0 | 0.6 | 1.7 | 43 |
| 3b | 0.005 | 13–15 | 399 | 4.5 | 12.9 | 56 |
| 3c | 0.016 | 9–13 | 467 | 4.8 | 14.5 | 61 |
| 3d | 0.07 | 9–10 | 446 | 6.2 | 18.6 | 66 |
| 3e | 0.16 | 9–11 | 502 | 6.6 | 19.6 | 67 |
| 3f | 0.3 | 8–12 | 523 | 5.9 | 16.8 | 60 |
| 3g | 0.5 | 7–11 | 370 | 5.7 | 13.6 | 46 |
| 3h | 1.0 | 10–11 | 397 | 4.6 | 1.5 | 4 |

EXAMPLE 4

Pt-Pd/SiO$_2$

Preparation of Silica Supported Pt-Pd Catalysts From Metal Salts

A series of Pt-Pd catalysts were prepared on silica using metal salts as the metal source. For each catalyst prepared, the relative amounts of $PdCl_2$ and $H_2PtCl_6 \cdot 6H_2O$ used are indicated in Table 4-A. The catalysts were prepared according to the following procedure. The water employed in the catalyst preparation was purified prior to use, as described previously. For each catalyst synthesis, the required amount of $H_2PtCl_6 \cdot 6H_2O$ was weighed out and dissolved in 380 mL of water. The $PdCl_2$ was also weighed out and added to 380 mL of water with the addition of 3 mL 1N HCl. The as-prepared $PdCl_2$ and chloroplatinic acid solutions were combined and stirred for approximately ten minutes. Next, 10 g of an aqueous colloidal dispersion of silica particles (commercially available from E. I. du Pont de Nemours and Company under the registered trademark Ludox-HS-40) was added. This mixture was stirred for approximately 5 minutes and then spray dried using a Buchi laboratory scale spray dryer. Generally the spray drying was done using an inlet temperature of 220° C. and an outlet temperature of 110° C. In Preps 4a–4g, the material collected from the spray drying was a light orange powder. Run 4H afforded a light yellow powder after spray drying. The powder was then subjected to a hydrogen treatment procedure similar to that described previously, except that 300° C. was used. This material was used as the active catalyst.

TABLE 4-A

Pt—Pd/SiO$_2$ From Metal Salts
Preparation of Catalysts Used in Table 4-B

| Prep. | Wt. $PdCl_2$ Used | Wt. $H_2PtCl_6 \cdot 6H_2O$ Used |
|---|---|---|
| 4a | 0.0333 g | — |
| 4b | 0.0667 g | 0.0018 g |
| 4c | 0.0632 g | 0.0052 g |
| 4d | 0.0567 g | 0.0159 g |
| 4e | 0.0500 g | 0.0265 g |
| 4f | 0.0320 g | 0.0468 g |
| 4g | 0.0200 g | 0.0743 g |
| 4h | — | 0.0531 g |

TABLE 4-B

| Prep. | Pt Pt + Pd | Temp. °C. | ΔP psi | ΔWT g | Wt. % $H_2O_2$ | Sel (%) |
|---|---|---|---|---|---|---|
| 4a | 0.0 | 13–15 | 62 | 0.9 | 3.6 | 73 |
| 4b | 0.017 | 13–15 | 139 | 2.1 | 8.0 | 74 |
| 4c | 0.05 | 12–14 | 360 | 5.3 | 16.9 | 69 |
| 4d | 0.15 | 10–13 | 349 | 5.4 | 15.4 | 58 |
| 4e | 0.25 | 10–12 | 339 | 5.3 | 14.5 | 54 |
| 4f | 0.5 | 9–11 | 334 | 4.7 | 10.5 | 39 |
| 4g | 0.7 | 8–12 | 323 | 4.5 | 8.4 | 31 |

TABLE 4-B-continued

| Prep. | Pt/Pt + Pd | Temp. °C. | ΔP psi | ΔWT g | Wt. % $H_2O_2$ | Sel (%) |
|---|---|---|---|---|---|---|
| 4h | 1.0 | 13–15 | 319 | 3.9 | 4.6 | 17 |

What is claimed is:

1. In a process for making hydrogen peroxide from the direct combination of hydrogen and oxygen in an aqueous reaction medium having no organic component present in excess of 2% by weight of the reaction medium, in the presence of $H^+$ and either $Br^-$ or $Cl^-$ ions and a combination platinum/palladium catalyst, the improvement comprising using the platinum and palladium in amounts such that the weight ratio of platinum to platinum plus palladium is in the range of about 0.02 to about 0.2.

2. The process of claim 1 wherein the combination platinum/palladium catalyst is supported on a support selected from the group consisting of carbon, silica and alumina.

3. The process of claim 2 wherein the catalyst is made by combining a preformed colloid comprising platinum and palladium with the support.

4. The process of claim 2 wherein the catalyst is made by spray drying a mixture comprising colloidal silica and platinum and palladium salts.

* * * * *

UNITED STATES PATENT AND TRADEMARK OFFICE
CERTIFICATE OF CORRECTION

PATENT NO. : 4,832,938

DATED : May 23, 1989

INVENTOR(S) : Lawrence W. Gosser and Jo-Ann T. Schwartz

It is certified that error appears in the above-identified patent and that said Letters Patent is hereby corrected as shown below:

Tables 1-B, 2-B, 3-B and 4-B are all missing the divider line in the column 2 heading and should read $\dfrac{Pt}{Pt+Pd}$.

Signed and Sealed this

Tenth Day of April, 1990

Attest:

HARRY F. MANBECK, JR.

Attesting Officer        Commissioner of Patents and Trademarks